US008732092B2

(12) United States Patent
Rourke

(10) Patent No.: US 8,732,092 B2
(45) Date of Patent: May 20, 2014

(54) FUNDRAISING METHOD AND SYSTEM

(76) Inventor: Leo J Rourke, Tomball, TX (US)

( * ) Notice: Subject to any disclaimer, the term of this patent is extended or adjusted under 35 U.S.C. 154(b) by 1560 days.

(21) Appl. No.: 11/864,067

(22) Filed: Sep. 28, 2007

(65) Prior Publication Data
US 2008/0228573 A1 Sep. 18, 2008

Related U.S. Application Data

(60) Provisional application No. 60/827,247, filed on Sep. 28, 2006.

(51) Int. Cl.
G06Q 99/00 (2006.01)
G06Q 20/00 (2012.01)

(52) U.S. Cl.
USPC .......................................... 705/329; 705/17

(58) Field of Classification Search
USPC ................................................. 705/329, 17
See application file for complete search history.

(56) References Cited

U.S. PATENT DOCUMENTS

| | | | |
|---|---|---|---|
| 5,025,372 A | 6/1991 | Burton et al. | |
| 5,056,019 A | 10/1991 | Schultz et al. | |
| 5,471,669 A | 11/1995 | Lidman | |
| 5,727,153 A | 3/1998 | Powell | |
| 5,992,888 A | 11/1999 | North et al. | |
| 6,128,599 A | 10/2000 | Walker et al. | |
| 6,330,543 B1 | 12/2001 | Kepecs | |
| 6,920,611 B1 | 7/2005 | Spaeth et al. | |
| 6,945,453 B1 | 9/2005 | Schwarz Jr. | |
| 6,985,879 B2 | 1/2006 | Walker et al. | |
| 7,013,286 B1 | 3/2006 | Aggarwal et al. | |
| 7,066,383 B2 | 6/2006 | Roth | |
| 7,085,731 B1 | 8/2006 | Powell et al. | |
| 7,319,977 B2* | 1/2008 | McGee et al. | 705/14.26 |
| 2003/0028483 A1* | 2/2003 | Sanders et al. | 705/40 |
| 2004/0199422 A1 | 10/2004 | Napier et al. | |
| 2005/0010473 A1 | 1/2005 | McLaughlin | |
| 2005/0108093 A1 | 5/2005 | Cumming et al. | |
| 2005/0119938 A1 | 6/2005 | Smith et al. | |
| 2005/0267802 A1 | 12/2005 | Ogren | |
| 2006/0155603 A1 | 7/2006 | Abendroth et al. | |
| 2007/0088612 A1* | 4/2007 | Simonian | 705/17 |

* cited by examiner

Primary Examiner — Sun Li

(57) ABSTRACT

The present disclosure describes a fund raising method and system wherein a provider produces discount cards containing information such as the manufacturer ID, the family code, and the value code. The information may appear on the card in the form of a bar code, a magnetic strip or by any other commonly recognized means. Representatives of an organization sell the discount cards to interested parties. When those parties present the discount cards at an enrolled retailer at the time of check-out, the card is read by the reader which is in communication with the retailer's payment system. The holder is then credited a pre-specified percentage of the sale at the time of sale and a percentage of the sale is set aside by the retailer. On a periodic basis, the amount set aside by the retailer is paid to the provider whereupon the provider pays a pre-specified portion of that amount to the organization.

11 Claims, 2 Drawing Sheets

FUNDRAISING METHOD AND SYSTEM

RELATED APPLICATION

This application claims the benefit of U.S. provisional application No. 60/827,247 filed Sep. 28, 2006 and entitled "Fundraising Method and System" which is hereby incorporated by reference herein, and claims the benefit thereof.

TECHNICAL FIELD

The present disclosure relates to a fundraising method and, more particularly, to the use of discount cards by consumers wherein a portion of the discount is transferred to the card seller and, thereafter, to an educational institution or other organization. The fund raising method and system of the instant disclosure also present novel opportunities for marketing products and services to retailers interested in target marketing.

BACKGROUND OF THE INVENTION

There are many methods for raising funds by charitable and other non-profit organizations. One method is the solicitation of direct monetary donations by members of the organization and by non-members who support the goals and programs of such organizations. Another common approach is the solicitation of goods and services from retailers and vendors which are then sold, raffled, or given away as door prizes at social events and functions of the organizations, at which nominal donations are requested for admission. Generally, the retailers motive in such donations to the organization is the creation of goodwill for the retailer among the members of the organization and others who might then be more likely to patronize the retailer. Additional motivations may include support for or membership in the organization by a person prominent in the retailer's establishment.

Many members who would otherwise be willing to make direct donations to their organization are unable to do so or are limited in the amount they can donate because of limitations in their finances or more pressing financial obligations. Similarly, retailers may be restricted from donations to organizations by their corporate policies or may perceive little benefit to their establishments in making such donations. Donations to organizations may also be impractical for some retailers, such as vendors of large or expensive items like major appliances, furniture, or the like.

Therefore, for a method of raising funds for organizations wherein retailers are provided an incentive to offer a discount to consumers, consumers are offered an incentive to shop at participating retailers, and a portion of the total purchase amount benefits the consumer directly at the time of the transaction and a portion of the total purchase amount benefits a charitable or non-profit organization selected by the consumer is presented herein.

The instant disclosure describes a fund raising method and system wherein a provider produces discount cards containing information such as, but not limited to the manufacturer ID, the family code, and the value code. The information may appear on the card in the form of a bar code, a magnetic strip or by any other commonly recognized methods. Retailers interested in selling products or services to supporters of an organization are enrolled and the card is activated to work in connection with the retailer's system, such as, but not limited to a point-of-sale (POS) terminal. Representatives of an organization sell or otherwise distribute the discount cards to supporters of the organization or other interested parties. When the holder of the card presents the discount cards at an enrolled retailer at the time of check-out, the card is read by the reader which is in communication with the retailer's payment system. The holder is then credited a pre-specified percentage of the sale at the time of sale and a second percentage of the sale is set aside by the retailer. On a periodic basis, the amount set aside by the retailer is credited to the provider such as, example, by a cash payment, a credit or some other means of remuneration, whereupon the provider pays a pre-specified portion of that amount to the organization.

BRIEF DESCRIPTION OF DRAWINGS

For a further understanding of the nature and objects of the instant disclosure, reference should be had to the following detailed description, taken in conjunction with the accompanying drawings, in which like elements are given the same or analogous reference numbers.

DETAILED DESCRIPTION OF EMBODIMENTS

Figure 1:
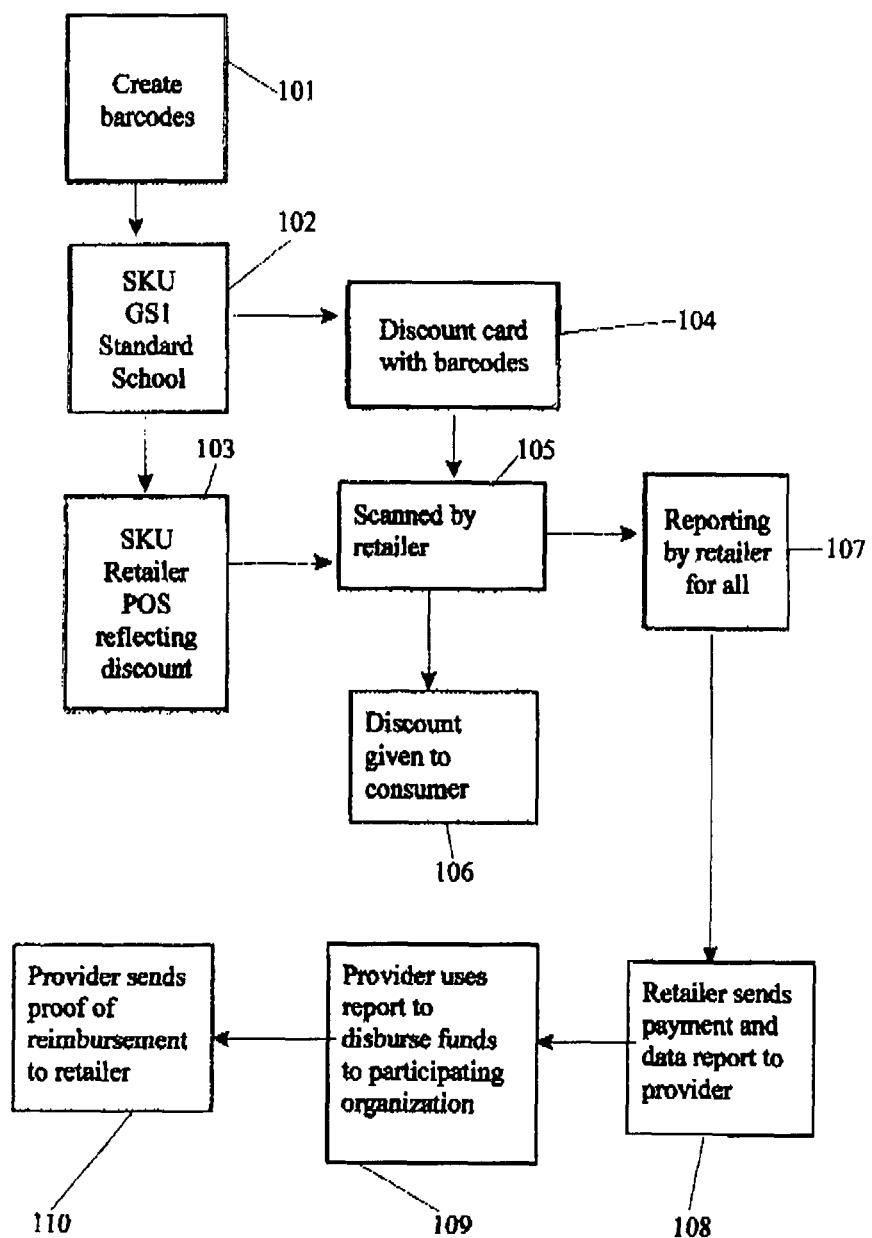
FIG. 1 illustrates a flow diagram of one embodiment in accordance with the present invention.

The instant disclosure relates to a fundraising program for charitable or non-profit organizations. This method and system frees the benefiting organization from having to sell merchandise that is often perceived as being overpriced or is perceived as unwanted for the purpose of supporting the organization. In its broadest form, supporters of an organization sell discount cards whereupon the organization receives all or a portion of the revenue from such sales. Thereafter, a retailer provides a discount at the time of sale to the cardholder and also sets aside an additional amount which is delivered to the provider of the card on a periodic basis. It should be understood that the term retailer includes any type of vendor, wholesaler, service provider and the like and that the system and methods, disclosed herein, can be used in conjunction with any type of such vendor or service provider. When the additional amount is delivered to the provider, it is accompanied by a report indicating which organizations are to receive funds from the provider based on information on the card. The organization then receives a payment from the provider. In short, the organization receives revenue at the time of the sale and on an ongoing basis thereafter.

In one embodiment, the provider of the card contracts with a non profit organization to provide fund raising campaign materials, expertise, and literature designed to promote the sale and usage of the card. By way of example and not as a limitation, the card may sell for $20 or another predetermined price. The non-profit organization receives a commission from the sale. The commission may be in the range of 40% to 60% of the sale price of the card, but could be any percentage acceptable to the parties. Typically, the provider of the card has already contacted various retailers, service providers, and the like to secure their participation in various fundraising activities. However, it should be appreciated, that depending on the organization being funded, specific retailers or service providers can be targeted based on the goals of the organization. When the card is presented at an enrolled retailer, the cardholder receives a discount off of the total purchase price. The retailer aggregates sales transactions electronically or manually and submits a periodic summary report to the provider showing, among other things, the amount of the discount, the amount to be tendered to the provider, and the organization affiliated with the transaction. The provider subsequently forwards a portion of the funds received from the retailer to the organization.

The fundraising program, described herein, continues providing revenue to the organization on an ongoing basis, unlike the coupons or one-time offers disclosed in the prior art. The term of the card can vary depending on the organization and the retailers or service providers. For instance, and not intended as a limitation, a long standing organization, such as a scouting group, or other social organization may want cards with a long term expiration date as that group will exist for many years. Such a group would more likely continue to distribute/sell cards to new members as they join. Other organizations, with shorter term goals, such as a school PTA or a sports team that changes players yearly, may just want cards with a specific expiration. It should be understood that some organizations, such as, but not limited to, a school PTA or PTO, may be limited in there fundraising activities. These type of organizations, by charter or by mandate, may be limited to only one or two fundraising events a year. Thus, such organizations would want to pick a fundraising method that generates the most benefit. Thus, the instant method and system provides fundraising that includes multiple choices for shopping and services and is more applicable to the needs of a greater variety of supporters and their families, friends, and co-workers. Further, certain vendors (retailers and/or service providers) may want to limit the time a card is usable. These vendors may need specific expiration dates as their prices or business policies may change. However, the card provider can keep track of a particular organization and deactivate cards as the need no longer exists. In one embodiment, the provider of a discount card offers a fundraising method and system to an organization. Representatives of the organization sell, trade, or otherwise distribute the discount card to parties that are supportive of the organization. By presenting the card to participating retailers, the holder of the card receives a discount on the goods or services purchased at the retailer. In addition, at the time of the sale an amount is set aside and credited to the provider such as, for example, by a cash payment, a credit or some other method of remuneration, on a periodic basis. Thereafter, the provider pays a portion of the amount received to the organization.

In addition to presenting a novel fundraising method, the instant disclosure presents a novel opportunity for retailers to reach supporters of the organization. Many discount programs require the retailer to give a discount to the card holder without providing a benefit to the retailer. Retailers commonly perceive these programs to be mere donations to the organization. By contrast, the method of the disclosed system and methods requires that supporters of the organization visit the store or website to use the card and, as a result, the cards drive traffic to the retailer. An added benefit to the retailer or service provider is the additional data gathered by the retailer or service provide regarding the consumers. Thus, the retailer or service provider can expand its marketing base.

There are a wide variety of organizations that could benefit from the disclosed system and methods, including, but not limited to, schools, Rotary clubs, Kiwanis clubs, Jaycees, Masons, Catholic charities, United Jewish Communities, college alumni associations, national fraternities and sororities, American Association of Retired Persons, credit and trade unions, military organizations, religious institutions, scouting organizations, youth sports organizations and/or teams, corporate human resources departments, foundations, other ethnic or religious organizations, and other organizations interested in raising funds.

Those involved in the sale of the cards may be offered incentives to sell cards. For example, upon the sale of a certain number of cards the seller may receive another card for free. The seller can then sell the additional card and retain the proceeds from the sale or simply use the card. It should be appreciated that a variety of incentives can be provided for the selling of the cards and should not be viewed as a limitation herein.

Preferably, the card can be any product or device that is capable of operating in conjunction with the retailer's standard POS system. The card may contain a depiction of the organization, such as a logo, mascot or school picture. The card would also contain a method or means for transmitting information to the retailer's point of sale system, such as a bar code, a magnetic tape, an RFID device, or the like. The card could also be a scanable coupon. The card may take the form commonly known in the art for devices used in financial transactions. It should be understood that the term "card" nor the description contained herein is intended to be limiting. It is foreseeable that such a "card" can have a large variety of embodiments including, but not limited to plastic credit card size, a scanable key chain card, a card, coupon, or paper with a specific serial number, and the like. Preferably the card is of the plastic credit card shape so as to be easily identified by the user, be resilient, and allow the storage and/or transmission of various data.

The information transmitted to the retailer may be, by way of example and not intended as limiting, the amount of the discount to be received by the card holder, the identity of the card provider, the identity of the charitable organization, the identity of the card holder, other marketing information, and/or any other information useful in the completion of the contemplated transaction. It should be appreciated that the cards can also be used for internet or other web based purchases. In such cases, it is preferable that the barcode number, or other card identification number be visible on the card. In such cases, the card number, barcode number, or any other specific identifier can be entered by computer to complete such internet or web based purchases. The card may be configured so as to include a time limit period which it is valid. Alternatively, the card may be renewable so that the holder can continue to receive discounts, the provider continues to receive payments from the retailer, and the organization continues to receive funds from the provider.

In one embodiment, when the card is presented to the retailer, preferably, the retailer's standard point-of-sale system treats the card like a product, with the amount of the product designated as a credit in the system. In essence, the card could be used with any point-of-sale system that recognizes the bar code or other method of transmitting information. In another embodiment, the card would simply represent a discount off of the products purchased at the retailer.

In one embodiment, the methods of conveying information to the retailer's point-of-sale system is a bar code. The bar code is a conventional bar code, capable of being read by any commonly used system. The bar code may contain information regarding the provider, the organization, the holder, the discount, or any other information relevant to the transaction or the method described herein.

Referring now to FIG. 1, a barcode 101 is created that contains information such as the SKU, the GS 1 or the standard school number on the card 102. Information corresponding to the information on the card is entered into the retailer's point-of-sale system 103. When the discount card with the barcode is presented to the retailer 104, the card is scanned by the retailer 105 and the discount is given to the consumer 106. Thereafter, the retailer provides a report for all sales under the card's SKU 107. It should be appreciated that it is preferable that any contracts and/or agreements, between the provider and the retailer/service provider, address the requirements and methods of providing the sales reports or accessing the sales reports. The retailer then compensates the provider in accordance with the agreement between the retailer and the provider 108. The provider then disburses funds to the organization 109. Alternatively, the provider could make arrangements to provide services or products, such as computers or other assets, to the organization for which the provider has negotiated a discounted rate. The provider can also forward confirmation to the retailer that the provider has paid or otherwise provided products or services to the organization 110.

The party acquiring the card could be a supporter of the organization or may simply be interested in receiving the discount offered by the card. They could hold a single card so that funds from their purchases at participating retailers would be credited to a single organization or they could hold a plurality of cards so that, at the time of the purchase, they could present the card associated with the organization of their choice or divide the discount between one or more of the organizations for which they hold cards. Further, because the card can be used with national retailers or corporate stores, the supporters of the organization or any others wishing to use the card are not limited to those within the area of the organization as is frequently found in prior art fundraising systems. Thus, the card can be used on a national level and can be sold, for example and not intended as limiting, to relatives or friends of supporters who may live in different towns or states than where the organization is located.

Because the card can be used in multiple transactions at a single retailer, or at one or more transactions at multiple retailers, the organization will continue to receive revenue as card holders continue to engage in transactions. The organization is no longer required to enter order forms or other paperwork associated with programs known in the art. If the cards contain an expiration date, the provider may elect to provide a notice to the card holder alerting them that the card is about to expire. In those cases, the card holder may be given an opportunity to extend the existing card or purchase a new card. In either case, the organization will continue to benefit from transaction in which the card holder engages.

The provider may elect to provide a website or other method of communication which provides the organization with information regarding the amount of revenue generated through the use of the discount card or other information relevant to the program. The website may be password protected. The information could be presented on a daily, weekly or monthly basis and may be used in the promotion of contests among the sellers of the cards.

Figure 2:
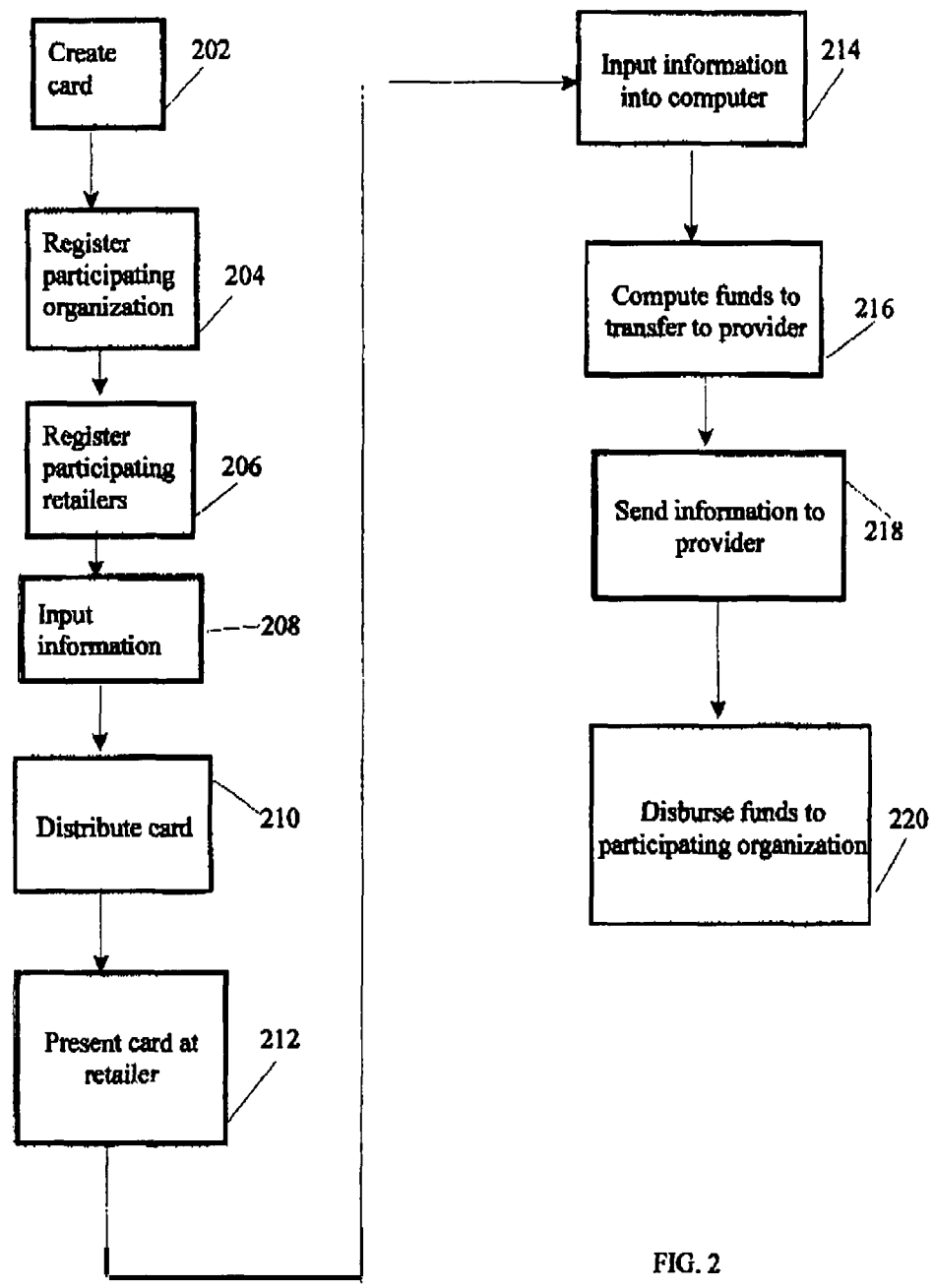
FIG. 2 illustrates a flow diagram of a computer system tracking and controlling fund disbursements in accordance with the present invention.

Referring now to FIG. 2, a flow chart illustrating computer control and tracking of the card use is shown. The card is created in step 202. To use the card, the provider will preferably register the organization 204 seeking the benefit of the card. The provider will also negotiate with and register the participating retailers or service providers 206 who will honor the card. The information regarding the benefiting organization and retailers is inputted into the card 208. At step 210, the card is distributed to supporters and the like. It should be understood that this distribution includes the sale of the card or other distribution arrangement made between the benefiting organization and the provider. At step 212, the card is presented to a selected retailer for intended purchases. The card is scanned, preferably at the retailer's POS terminal. At step 214, the information, on the card as well as information relating to the sales transaction is stored by a conventional computer system utilized by the retailer. The computer system can then compute 216 the discount to be applied to the instant transaction, for the card holder as well as compute the funds that will be distributed to the provider. This information can then be transmitted 218 to the provider. Such transmission 218 may be by link to the providers computer system, by web page, or any other conventional method. It should be understood that such information can be transmitted at the time of the transaction or in some predetermined intervals as agreed to between the provider and the retailer. At step 220 the provider can disburse the accrued funds to the proper organization. It should be further understood that the timing of this distribution is preferably agreed upon between the provider and the benefiting organization.

The advantages of the system and method described herein are numerous. For example, the organization does not have to invest its limited resources in ordering products, storing large quantities of consumer goods, and thereafter provide staff and professionals to distribute these goods while still being able to provide a card to its supporters that may be used at national retailers for products and services that are desirable to the supporters. It should be understood that, as disclosed hereinabove, the use of the card and the discount benefits are preferably not limited to the region surrounding the benefiting organization and thus can be used by friends and relatives of the supporters of the organization. However, if desired, local establishments can be added as retailers who accept the cards. Retailers are able to generate traffic through targeted marketing and are provided automatic and bias-free distribution of charitable contributions to entities their customers have selected, thereby enhancing customer satisfaction and loyalty. Supporters are able to receive discounts on products and services desirable to them. The provider is able to reap the benefits of selling a product (i.e. the card) that requires no inventory and allows for growth.

While the present system and method has been disclosed according to the preferred embodiment, those of ordinary skill in the art will understand that other embodiments have also been enabled. Even though the foregoing discussion has focused on particular embodiments, it is understood that other configurations are contemplated. In particular, even though the expressions "in one embodiment" or "in another embodiment" are used herein, these phrases are meant to generally reference embodiment possibilities and are not intended to limit the system or methods disclosed herein to those particular embodiment configurations. These terms may reference the same or different embodiments, and are combinable into aggregate embodiments. The terms "a", "an" and "the" may also mean "one or more".

When a single embodiment is described herein, it will be readily apparent that more than one embodiment may be used in place of a single embodiment. Similarly, where more than one embodiment is described herein, it will be readily apparent that a single embodiment may be substituted for that one device.

In light of the wide variety of fundraising activities, the detailed embodiments are intended to be illustrative only and should not be taken as limiting the scope of the instant disclosure. Rather, what is claimed is all such modifications as may come within the spirit and scope of the following claims and equivalents thereto.

None of the description in this specification should be read as implying that any particular element, step or function is an essential element which must be included in the claim scope. The scope of the patented subject matter is defined by the allowed claims and their equivalents. Unless explicitly recited, other aspects of the instant disclosure as described in this specification do not limit the scope of the claims. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

The invention claimed is:

1. A computer implemented fundraising method comprising:
   producing a discount card containing information relating to the provider of said discount card and one or more organizations;
   selecting participating retailers;
   registering at least one retailer or service provider to accept said discount card;
   registering at least one organization to benefit from said discount card;
   inputting a discount rate into a first computer;
   identifying the benefitting organization;
   distributing said discount card to the potential users independent of financial status or credit worthiness;
   discounting the purchase price on purchases made by said users who present said discount card to participating retailers or service providers, wherein said discounting comprises accessing said first computer to determine the type or amount of the discount;
   utilizing said first computer to determine the card validity;
   further comprising using said computer system to track purchases made by the card and determining credit to be transferred to said provider;
   computing, by a processor, a first portion of the purchase price to be transmitted to the provider;
   transmitting, by said first computer, purchase details and information to a second computer;
   crediting, by a processor, and transmitting the first portion of said purchase price, on each purchases made, to the provider of the card, wherein said transmitting comprises electronically depositing said first portion to a designated account of the provider; and
   crediting, by a processor, a pre-agreed percentage of said first portion, received by said provider, to said organization, wherein said crediting comprises electronically depositing said pre-agreed percentage to a designated account of the organization, wherein said provider retains the remaining percentage of said first portion for each purchase, and wherein said crediting a first portion of said purchase price of purchases made to the provider of the card is done concurrently with said purchase.

2. The method of claim 1, wherein said organization is a charitable organization or a non-profit organization.

3. The method of claim 1, wherein distributing said discount card comprises selling said discount card.

4. The method of claim 3, wherein said organizations receive a portion of the sales price of the discount card.

5. The method of claim 4, wherein said portion of the sales price is in a range from about 40% to 60% of the sales price.

6. The method of claim 1, wherein said users of the card are supporters of said organizations.

7. The method of claim 1, further comprising accessing the information contained on the card, by said retailers or service providers, wherein said accessing is through a computer.

8. The method of claim 1, further comprising imprinting said organizations' or said retailers' name or logo on the card.

9. The method of claim 1, further comprising negotiating a discount program with said retailers by said provider.

10. A fundraising system comprising:
    a processor, and
    a memory, configured to:
    produce a discount card containing information relating to the provider of said discount card and one or more organizations;
    track the use of said discount card by a computer system, wherein the computer system includes at least a first computer and a second computer, and wherein said computer system determines the amount of a discount and the amount of a sales transaction to be credited to a provider of said discount card;
    register at least one organization to benefit from said discount card;
    register at least one retailer or service provider to accept the use of the discount card;
    encode information on said discount card, wherein said information comprises at least the discount rate and identifies the benefitting organization;
    electronically read said discount card and transmit said encoded information into said first computer;
    input sales information generated by using said discount card into said first computer; calculate an applicable discount for the sales transaction and transmit the sales and discount information to the second computer;
    further comprising using said computer system to track purchases made by the card and determining credit to be transferred to said provider;
    electronically credit and transmit, to said provider, a first pre-determined portion of each sales transaction made using said discount card;
    credit said organization with a predetermined percentage of said first pre-determined portion of each sales transaction, wherein the credit comprises depositing the pre-determined percentage of said first pre-determined portion of each sales transaction to a designated account of the organization, wherein said provider retains a remaining portion of the predetermined percentage of said first pre-determined portion of each sales transaction; and
    credit a first portion of said purchase price of purchases made to the provider of the card is done concurrently with said purchase.

11. The system of claim 10, wherein said organization is a charitable organization or a non-profit organization.

* * * * *